US011935081B2

(12) United States Patent
Besehanic et al.

(10) Patent No.: US 11,935,081 B2
(45) Date of Patent: *Mar. 19, 2024

(54) METHODS AND APPARATUS TO DETERMINE THE PROBABILITY OF PRESENCE (71) Applicant: The Nielsen Company (US), LLC, New York, NY (US)

(72) Inventors: Jan Besehanic, Tampa, FL (US); Arun Ramaswamy, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,694

(22) Filed: Aug. 16, 2021

(65) Prior Publication Data

US 2021/0374779 A1 Dec. 2, 2021

Related U.S. Application Data (63) Continuation of application No. 14/753,668, filed on Jun. 29, 2015, now Pat. No. 11,093,956.

(51) Int. Cl.
G06Q 30/0204 (2023.01)
(52) U.S. Cl.
CPC ................. G06Q 30/0204 (2013.01)
(58) Field of Classification Search
CPC .................................................. G06Q 30/0204
See application file for complete search history.

(56) References Cited

U.S. PATENT DOCUMENTS

| 7,930,285 | B2 | 4/2011 | Abraham et al. |
| 8,560,675 | B2 | 10/2013 | Honnold et al. |
| 8,874,652 | B1 | 10/2014 | Pecjak et al. |
| 8,996,727 | B2 | 3/2015 | DeFrancesco et al. |
| 11,093,956 | B2 | 8/2021 | Besehanic et al. |
| 2003/0101449 | A1 | 5/2003 | Bentolila et al. |
| 2007/0073682 | A1 | 3/2007 | Adar et al. |
| 2009/0007169 | A1 | 1/2009 | Headley et al. |
| 2009/0077579 | A1 | 3/2009 | Li et al. |
| 2009/0187939 | A1 | 7/2009 | Lajoie |
| 2009/0271819 | A1 | 10/2009 | Cansler et al. |
| 2009/0325713 | A1 | 12/2009 | Cansler et al. |

(Continued)

OTHER PUBLICATIONS

Danaher, Peter J., "Modeling Page Views Across Multiple Websites with an Application to Internet Reach and Frequency Prediction", Marketing Science, vol. 26, No. 3, dated May-Jun. 2007, 17 pages.

(Continued)

*Primary Examiner* — Andre D Boyce (57) ABSTRACT

Methods, apparatus, systems and articles of manufacture are disclosed for determining a probability of presence for a user of a first device at a second media presentation with a second device. An example apparatus includes memory, instructions in the apparatus, and processor circuitry to execute the instructions to determine a first probability of presence based on a first demographic impression, a non-demographic impression, and a shared data item, the first demographic impression logged by a database proprietor for a first device, the shared data item provided by the first device, the first probability of presence indicative of a likelihood that a user of the first device corresponds to the non-demographic impression.

18 Claims, 4 Drawing Sheets

(56) References Cited

U.S. PATENT DOCUMENTS

| | | |
|---|---|---|
| 2012/0072469 A1 | 3/2012 | Perez et al. |
| 2012/0110027 A1 | 5/2012 | Falcon |
| 2012/0204204 A1 | 8/2012 | Kouritzin et al. |
| 2013/0311649 A1 | 11/2013 | DeFrancesco et al. |
| 2013/0346550 A1 | 12/2013 | Higgins |
| 2014/0189108 A1 | 7/2014 | Frett et al. |
| 2014/0195674 A1 | 7/2014 | Pugh et al. |
| 2014/0237498 A1 | 8/2014 | Ivins |
| 2014/0280891 A1 | 9/2014 | Doe |
| 2014/0324544 A1 | 10/2014 | Donato et al. |
| 2014/0380350 A1 | 12/2014 | Shankar et al. |
| 2015/0095138 A1 | 4/2015 | Rao et al. |
| 2015/0237412 A1 | 8/2015 | Shimy et al. |
| 2015/0341453 A1 | 11/2015 | Miller et al. |
| 2016/0239868 A1 | 8/2016 | Demsey et al. |
| 2016/0269766 A1 | 9/2016 | Levande et al. |
| 2017/0236182 A1 | 8/2017 | Ignatyev |

OTHER PUBLICATIONS

Shachar et al., "Cast Demographics, Unobserved Segments and Heterogeneous Switching Costs in a Television Viewing Choice Model", Journal of Marketing Research, vol. XXXVII, dated May 2000, 15 pages.

United States Patent and Trademark Office, "Non-Final Office Action", issued in connection with U.S. Appl. No. 14/753,668, dated Oct. 1, 2018, 16 pages.

United States Patent and Trademark Office, "Final Office Action", issued in connection with U.S. Appl. No. 14/753,668, dated May 30, 2019, 24 pages.

United States Patent and Trademark Office, "Advisory Action", issued in connection with U.S. Appl. No. 14/753,668, dated Aug. 12, 2019, 3 pages.

United States Patent and Trademark Office, "Non-Final Office Action", issued in connection with U.S. Appl. No. 14/753,668, dated Sep. 12, 2019, 22 pages.

United States Patent and Trademark Office, "Final Office Action", issued in connection with U.S. Appl. No. 14/753,668, dated Apr. 10, 2020, 23 pages.

United States Patent and Trademark Office, "Advisory Action", issued in connection with U.S. Appl. No. 14/753,668, dated Jun. 23, 2020, 2 pages.

United States Patent and Trademark Office, "Non-Final Office Action", issued in connection with U.S. Appl. No. 14/753,668, dated Sep. 4, 2020, 16 pages.

United States Patent and Trademark Office, "Notice of Allowance and Fee(s) Due", issued in connection with U.S. Appl. No. 14/753,668, dated Apr. 14, 2021, 13 pages.

METHODS AND APPARATUS TO DETERMINE THE PROBABILITY OF PRESENCE

RELATED APPLICATIONS

This patent arises from a continuation of U.S. patent application Ser. No. 14/753,668, filed on Jun. 29, 2015, now U.S. Pat. No. 11,093,956. U.S. patent application Ser. No. 14/753,668 is hereby incorporated herein by reference in its entirety.

FIELD OF THE DISCLOSURE

This disclosure relates generally to media monitoring, and, more particularly, to methods and apparatus to determine the probability of presence.

BACKGROUND

Media providers desire to present media (e.g., content and/or advertisements) to users (e.g., audience members) that are likely to favorably respond. For example, an advertiser seeks to present targeted advertisements to users to encourage the users to purchase an advertised product. Typically, media providers are not well informed about when a particular user is physically present at a media presentation location, resulting in presentation of media that might not have any impact on the user.

Traditionally, audience measurement entities determined audience engagement levels for media based on registered panel members. That is, an audience measurement entity (AME) enrolled people who consented to being monitored into a panel. The AME then monitored those panel members to determine media (e.g., television programs, radio programs, movies, DVDs, advertisements, streaming media, websites, etc.) presented to those panel members. In this manner, the AME could determine exposure metrics for different media based on the collected media measurement data.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Techniques for monitoring user access to Internet-accessible media such as web pages, advertisements, content and/or other media have evolved significantly over the years. Internet-accessible media is also known as online media. At one point in the past, Internet-accessible media monitoring was done primarily through server logs. In particular, entities serving media on the Internet would log a number of requests received for media at their server. Basing Internet usage research on server logs is problematic for several reasons. For example, server logs can be tampered with either directly or via zombie programs that repeatedly request media from a server to increase server log counts. Secondly, media is sometimes retrieved once, cached locally and then repeatedly viewed from the local cache without involving the server in the repeat viewings. Server logs cannot track these repeat views of cached media. Thus, server logs are susceptible to both over-counting and under-counting errors.

As used herein, an Internet-connected device is defined to be any device that can connect to the Internet to access media. Example Internet-connected devices include, for example, smartphones, tablets (e.g., an iPad®), laptop computers, desktop computers, video game consoles (e.g., Xbox®, PlayStation®), set top boxes, digital media players (e.g., a Roku® media player, a Slingbox®, etc.), smart TVs, etc. During use of the Internet-connected device, monitoring instructions that are provided with and/or in association with media presented by the Internet-connected device (e.g., instructions provided as part of a webpage) are executed to transmit media monitoring data to an audience measurement entity (AME). When a client requests media from a server, both the media and the monitoring instructions are downloaded to the client. The monitoring instructions are then executed whenever the media is accessed, be it from a server or from a cache.

The media monitoring instructions may be known as beacon instructions, and media including beacon instructions is known as tagged media. As disclosed herein, media monitoring data is collected from Internet-connected devices using, for example, techniques in accordance with the teachings of Blumenau, U.S. Pat. No. 6,108,637, which is incorporated by reference herein. Moreover, in some examples, media monitoring data is collected from media devices in association with presentation of streaming media using techniques disclosed in U.S. patent application Ser. Nos. 13/341,646; 13/341,661; 13/443,596; 13/793,991; 13/445,961; 13/793,974; 13/472,170; 13/767,548; 13/793,959; 13/778,108; 14/502,434; and Ser. No. 14/502,452, which are incorporated by reference in their entirety. As used herein, the term "media" includes any type of content and/or advertisement (e.g., audio and/or video (still or moving) content and/or advertisement) delivered via any type of distribution medium. Thus, media includes television programming, television advertisements, radio programming, radio advertisements, movies, web sites, streaming media, television commercials, radio commercials, Internet ads, etc.

There are many database proprietors operating on the Internet to provide services to large numbers of subscribers. In exchange for the provision of the service, the subscribers register with the proprietor. As part of this registration, the subscribers provide detailed demographic information. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), etc. These database proprietors set cookies or other device/user identifiers on the client devices of their subscribers to enable the database proprietor to recognize the user when they visit their website.

The protocols of the Internet make cookies inaccessible outside of the domain (e.g., Internet domain, domain name, etc.) on which they were set. Thus, a cookie set in, for example, the amazon.com domain is accessible to servers in the amazon.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage and demographic data by extending the monitoring instructions (e.g. beacons) to transmit media monitoring data to the database proprietors as well as to the AME. This allows the AME to encompass partnered database proprietors and use such partners as interim data collectors. The inventions disclosed in Mainak et al. accomplish this task by structuring the AME to respond to beacon requests from clients (who may not be a member of an audience member panel and, thus, may be unknown to the AME) and redirect the client from the AME to a database proprietor such as a social network site partnered with the AME. The redirection initiates a communication session between the client accessing the tagged media and the database proprietor.

The database proprietor (e.g., Facebook) can access any cookie it has set on the client to thereby identify the client based on the internal records of the database proprietor. In the event the client corresponds to a subscriber of the database proprietor, the database proprietor logs an impression in association with the demographics data associated with the client (known as a demographic impression) and subsequently forwards logged demographic impressions to the AME.

As used herein, an impression is defined to be an event in which a home or individual is exposed to corresponding media (e.g., content and/or an advertisement). Thus, an impression represents a home or an individual having been exposed to media (e.g., an advertisement, content, a group of advertisements and/or a collection of content). As used herein, a demographic impression is defined to be an impression that is associated with a characteristic (e.g., a demographic characteristic) of the person exposed to the media.

In the event the client does not correspond to a subscriber of the database proprietor, the database proprietor may redirect the client to the AME and/or another database proprietor. The AME may respond to the redirection from the first database proprietor by redirecting the client to a second, different database proprietor that is partnered with the AME. That second database proprietor may then attempt to identify the client as explained above. This process of redirecting the client from database proprietor to database proprietor can be performed any number of times until the client is identified and the content exposure logged, or until all database partners have been contacted without a successful identification of the client. The redirections all occur automatically so the user of the client is not involved in the various communication sessions and may not even know they are occurring.

Significantly, because the AME remains the first leg of the data collection process (e.g., receives the request generated by the beacon instructions from the client), the AME is able to obscure the source of the media access being logged as well as the identity of the media itself from the database proprietors, without compromising the ability of the database proprietors to log demographic impressions for their subscribers. Further, when cookies are used as device/user identifiers, the Internet security cookie protocols are complied with because the only servers that access a given cookie are associated with the Internet domain (e.g., Facebook.com) that set that cookie.

Examples disclosed in Mainak et al. (U.S. Pat. No. 8,370,489) can be used to determine any type of media impressions or exposures (e.g., content impressions, advertisement impressions, content exposure, and/or advertisement exposure) using demographic information, which is distributed across different databases (e.g., different website owners, service providers, etc.) on the Internet. Not only do such disclosed examples enable more accurate correlation of Internet advertisement exposure to demographics, but they also effectively extend panel sizes and compositions beyond persons participating in the panel of an AME and/or a ratings entity to persons registered in other Internet databases such as the databases of social media sites such as Facebook, Twitter, Google, etc. Such extension effectively leverages the media tagging capabilities of the ratings entity and the use of databases of non-ratings entities such as social media and other websites to create an enormous, demographically accurate panel that results in accurate, reliable measurements of exposures to Internet media such as advertising and/or programming.

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users and use tagging (also referred to herein as beaconing), and/or other techniques to track impressions attributable to those users. Database proprietors maintain detailed demographic information (e.g., age, gender, geographic location, race, income level, education level, religion, etc.) collected via user registration processes. When a database proprietor logs an impression for one of its registered users, it is logged as a demographic impression.

In examples disclosed herein, an impression contains impression information about the media presentation. The impression information may include content information, Nielsen tags, timestamps, device sources, station identification (SID), IP address, user agent and the like. A demographic impression typically includes all the impression information plus demographic information. The demographic information may include gender, an age or an age range, address, income level, marital status, number of children (if any), education level and the like.

Although such techniques for collecting media impressions are based on highly accurate demographic information, in some instances impressions collected by a database proprietor (e.g., Facebook, Yahoo, Google, etc.) may be inaccurate and/or incomplete when the database proprietor does not have complete coverage of device/user identifiers (e.g., cookies) at all of the client devices that visit a site of the database proprietor. As used herein in this context, coverage represents the extent to which a database proprietor has set device/user identifiers in client devices that visit the site of the database proprietor. For example, if only 50% of client devices that visit the site of the database proprietor have a cookie set therein by the database proprietor, then the database proprietor has 50% coverage of client devices that visit its site. A client device may not have a cookie set by the database proprietor in its web browser if, for example, a user doesn't have an account with the database proprietor for that device or if the user has an account with the database proprietor but has cleared the cookie cache and deleted the database proprietor's cookie before or at the time of a media exposure. In such instances, the database proprietor would not be able to detect the media exposure and, thus, would not report any audience or impressions for that exposure.

In examples disclosed herein, a user may have access to multiple Internet-connected devices. For example, the user may have a smart phone, a laptop computer, a smart TV and a game console. The user may utilize one or more of these devices during a given time period (hour, day week, etc.). In some examples, a subset of the devices may be registered with one or more database proprietors (e. g. have cookies installed thereon). When the user accesses tagged Internet-accessible media from one of these registered devices, the database proprietor (e.g., Facebook) can access any cookie it has set on the device to thereby identify the user of the device based on the internal records of the database proprietor. In the event the client corresponds to a subscriber of the database proprietor, the database proprietor logs a demographic impression in association with the demographics data associated with the user and subsequently forwards logged demographics impressions to the AME.

When the user accesses tagged Internet-accessible media from one of the non-registered devices (e.g. a device without a cookie), the database proprietor (e.g., Facebook) will be unable to recognize the user, as no cookie will be active on the device. Because the Internet-accessible media is tagged, the AME will still receive an impression from the media presentation at the non-registered device. However, the impression that the AME receives is not a demographic impression and therefore the AME will not know the demographics for the person that watched the media presentation.

In examples disclosed herein, the example methods, systems and apparatus to determine the probability of presence is described. The probability of presence is the likelihood that a given user was present during the media presentation. The probability of presence is determined by accessing a demographic impression from a database proprietor for a user of a first device for a first media presentation, accessing a non-demographic impression from a second device for a second media presentation, where the non-demographic impression has one shared data item with the demographic impression, and determining the probability of presence for the user of the first device during the second media presentation from the second device, based on the demographic impression, the non-demographic impression and the shared data item.

The example methods, systems and apparatus to determine the probability of presence may be implemented by an AME (e.g., any entity interested in measuring or tracking audience exposures to advertisements, content, and/or any other media) in cooperation with any number of database proprietors such as online web services providers. Such database proprietors/online web services providers may be social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian) and/or any other web service(s) site that maintains user registration records.

Figure 1:
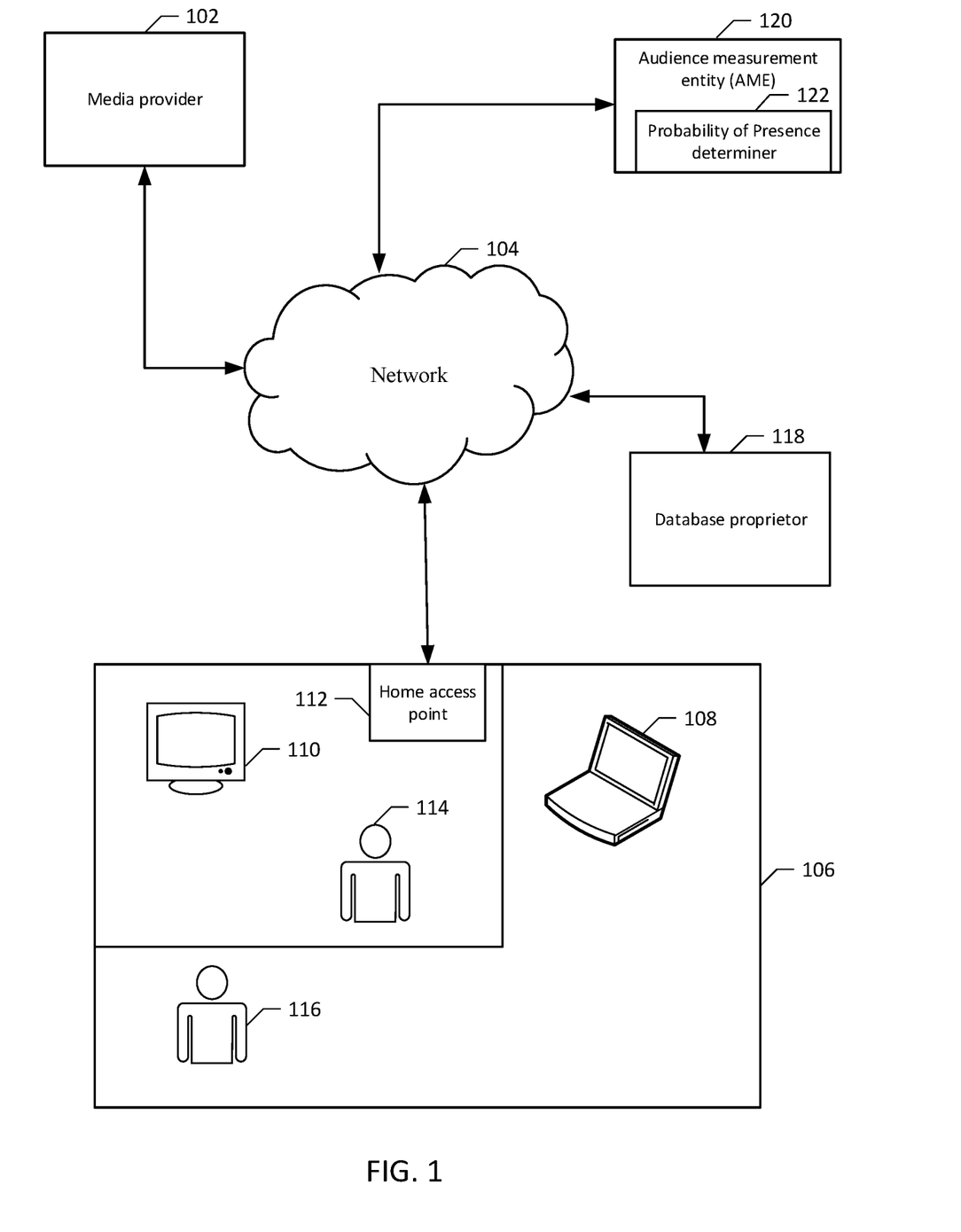
FIG. 1 is a diagram illustrating an example environment in which an example audience measurement entity (AME), including an example probability of presence determiner, operates.

FIG. 1 is a diagram illustrating an example environment in which an example audience measurement entity (AME), including an example probability of presence determiner, operates. FIG. 1 includes a media provider 102, a network 104, a media presentation location 106, a database proprietor 118 and an AME 120. The media provider 102, the media presentation location 106, the database proprietor 118 and the AME 120 are communicatively coupled together through the network 104, for example the Internet.

The media provider 102 provides media to the media presentation location 106 through the network 104. As used herein, the term "media" includes any type of content and/or advertisement delivered via any type of distribution medium. Thus, media includes television programming or advertisements, radio programming or advertisements, movies, web sites, streaming media, etc. The media provided by the media provider 102 may be tagged.

The media presentation location 106 includes a number of media presentation devices, or media devices (two are shown, 108 and 110). The example media devices 108 and 110 of the illustrated example shown in FIG. 1 are Internet-connected media devices that retrieve media from the media provider 102 for presentation. In some examples, the media devices 108 and 110 are capable of directly presenting media (e.g., via a display) while, in other examples, the media devices 108 and 110 presents the media on separate media presentation equipment (e.g., speakers, a display, etc.). Thus, as used herein "media devices" may or may not be able to present media without assistance from a second device.

Media devices that retrieve media from media providers 102 for presentation, for example media provider 102, may track the media that the devices present. The media may be tracked in a number of different ways. One way of having media devices track downloaded media is tagging the media. Tagged media is media that includes instructions, that when executed by the media device, causes the media device to send a message containing media monitoring data to an AME.

Media devices are typically consumer electronics. For example, the media devices 108 is a laptop computer and media device 110 is a smart television. While in the illustrated example, a laptop computer and a smart television are shown, any other type(s) and/or number(s) of media device(s) may additionally or alternatively be used. For example, personal computers such as a desktop computer, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. may additionally or alternatively be used.

The presentation location 106 has the first media device 108 in one location and the second media device 110 in a different location such that people viewing one of the media devices cannot view the other media device. In this example, two people are located at the presentation location 106. One person 114 is located such that they can view the second media device 110. One person 116 is located such that they cannot view either of the two media devices 108 or 110. The people at the presentation location 106 can move around, so at any given time, any combination of viewers can occur at any one of the media devices 108 and 110. In some examples, media device 108 is a mobile device (e.g. a laptop computer) and can be moved from room to room in the presentation location 106.

The presentation location 106 can be any location that has media devices. For example, the presentation location 106 can be a retail store, a shopping mall, a restaurant, a Wi-Fi hot spot, a home, a panelist household or the like. In this example, the presentation location 106 is a household.

In the illustrated example, the presentation location 106 includes a home access point 112 that is in communication with the network 104 via a service provider. The example home access point 112 of the illustrated example of FIG. 1 is a router that enables multiple devices within the presentation location 106 to communicate via the network 104. In one example, the home access point 112 hosts a wireless local area network (LAN) using, for example, Wi-Fi. In one example, the home access point is a modem provided by a networking service provider and may be networked to other devices in the presentation location. However, any other past, present, and/or future approach to hosting a local area network may additionally or alternatively be used. The home access point 112 issues a private IP address to each device that is communicatively coupled to the home access point 112. The private IP addresses enables devices on the LAN (e.g., the laptop computer 108 and the smart TV 110) to communicate with the home access point 112. The private IP addresses may also be known as an internal IP addresses.

As mentioned above, within the LAN hosted by the example home access point 112, individual devices (e.g., the laptop computer 108 and the smart TV 110) are given private IP addresses. In the illustrated example, the private IP addresses are assigned using a dynamic host of protocol (DHCP). When a device within the LAN transmits a request to a resource outside the LAN (e.g., on the Internet 104), the example home access point 112 translates the originating private IP address of the device making the request to the public address of the example home access point 112 before relaying request outside the LAN (e.g. to the destination). Thus, when the resource outside the LAN receives the request, the resource is able to transmit a return response to the LAN. On the return path, the example home access point 112 translates the destination IP address of the response to the private IP address of the requesting device so that the return message may be delivered to the device that made the original request.

When the media devices (108 and 110) report media monitoring data, the media monitoring data includes the public Internet Protocol (IP) address of the media device. The public IP address assigned to a media presentation location is shared by the media devices that are (1) at that media presentation location and (2) communicating via the ISP. As such, when an Internet connection is shared by multiple devices (e.g., via a wireless access point, via a router, etc.) those multiple devices use the same public IP address.

Database proprietor 118 may be a social network sites (e.g., Facebook, Twitter, MySpace, etc.), a multi-service sites (e.g., Yahoo!, Google, Axiom, Catalina, etc.), an online retailer sites (e.g., Amazon.com, Buy.com, etc.), a credit reporting sites (e.g., Experian) and/or any other web service(s) site that maintains user registration records. In this example only one database proprietor is shown, but there may be multiple database proprietors. In some examples, a subset of the total number of media devices 108, 110 at the presentation location 106 are registered with database proprietor 118 (e.g. have a cookie installed thereon). For example, media device 108 is registered with database proprietor 118 and media device 110 is not registered with database proprietor 118.

Example methods, apparatus, and articles of manufacture disclosed herein gather monitoring data in a census fashion. That is, many users from which monitoring data is gathered are not panelists and, in many cases, have not provided any demographic information regarding themselves to the AME (but may have indicated their consent to being monitored (e.g., have opted in) and/or have not opted out of such monitoring). In this example, none of the users are panelists and all the users and/or media devices have opted in such that their use can be monitored.

AME 120 receives impressions for tagged media from each of the media devices 108 and 110 through network 104. In some examples, the impressions includes: content information, Nielsen tags, timestamps, device sources, station identification (SID), IP address (e.g. the public IP address of the home access point 112), user agent and the like. The AME 120 stores the impressions in memory or onto a storage device, either local or remote.

After recording the impressions from the tagged media, the AME 120 redirects the media devices 108 and 110 from the AME to the database proprietor 118. The redirection initiates a communication session between the media devices (108 and 110) accessing the tagged media and database proprietor 118. The database proprietor 118 can access any cookie it has set on the media device to thereby identify the client based on the internal records of the database proprietor 118. In this example, media device 108 is registered with database proprietor 118. Therefore database proprietor 118 records a demographic impression for media device 108 when media device 108 accesses tagged media.

Media device 110 is not registered with database proprietor 118. Therefore, when media device 110 is redirected to database proprietor 118, database proprietor 118 does not recognize media device 110 and does not record a demographic impression when media device 110 accesses tagged media. The AME still records an impression when media device 110 accesses the tagged media, even though the database proprietor does not record a demographic impression.

The AME 120 accesses the demographic impression recorded by the database proprietor 118 created when the media device 108 accessed the tagged media. The AME 120 may access the demographic impression in any manner, for example by polling the database proprietor 118 on a periodic and/or aperiodic fashion, receiving the demographic impression each time the database proprietor 118 records a demographic impression, or the like.

The demographic impression contains impression information about the media presentation as well as demographic information about the user. The demographic information may also contain demographic information about a household the user is a member of. For example, the demographic information may identify the user as a 35 year old female that is married to a 35 year old male, the user has 3 children, ages 8, 12 and 15, has a college degree, works for Company A, and the like.

The impression information may include content information, Nielsen tags, timestamps, device sources, station identification (SID), IP address, user agent and the like. In some examples the impression information may contain: the media content (e.g. the name of the media, for example "Game of Thrones"), the types of device used to view the media (e.g. a laptop computer, for example device 108), a device identifier (e.g. a serial number of the device), a timestamp (e.g. the date and time when the media was presented, for example 2015-05-23 21:05:03), the IP address used by the device to access the media (e.g. the home IP address) and the like.

The impression information from the demographic impression is compared to impression information collected by the AME 120. When an impression collected by the AME 120 for a different media presentation on a different media device has at least one shared data item with the demographic impression, the probability of presence determiner 122 determines the probability of presence for a user at the second media presentation based on the demographic impression, the non-demographic impression and the shared data item. In some examples, more than one demographic impression from the first device is identified that has a shared data item with the impression from the second device.

Figure 2:
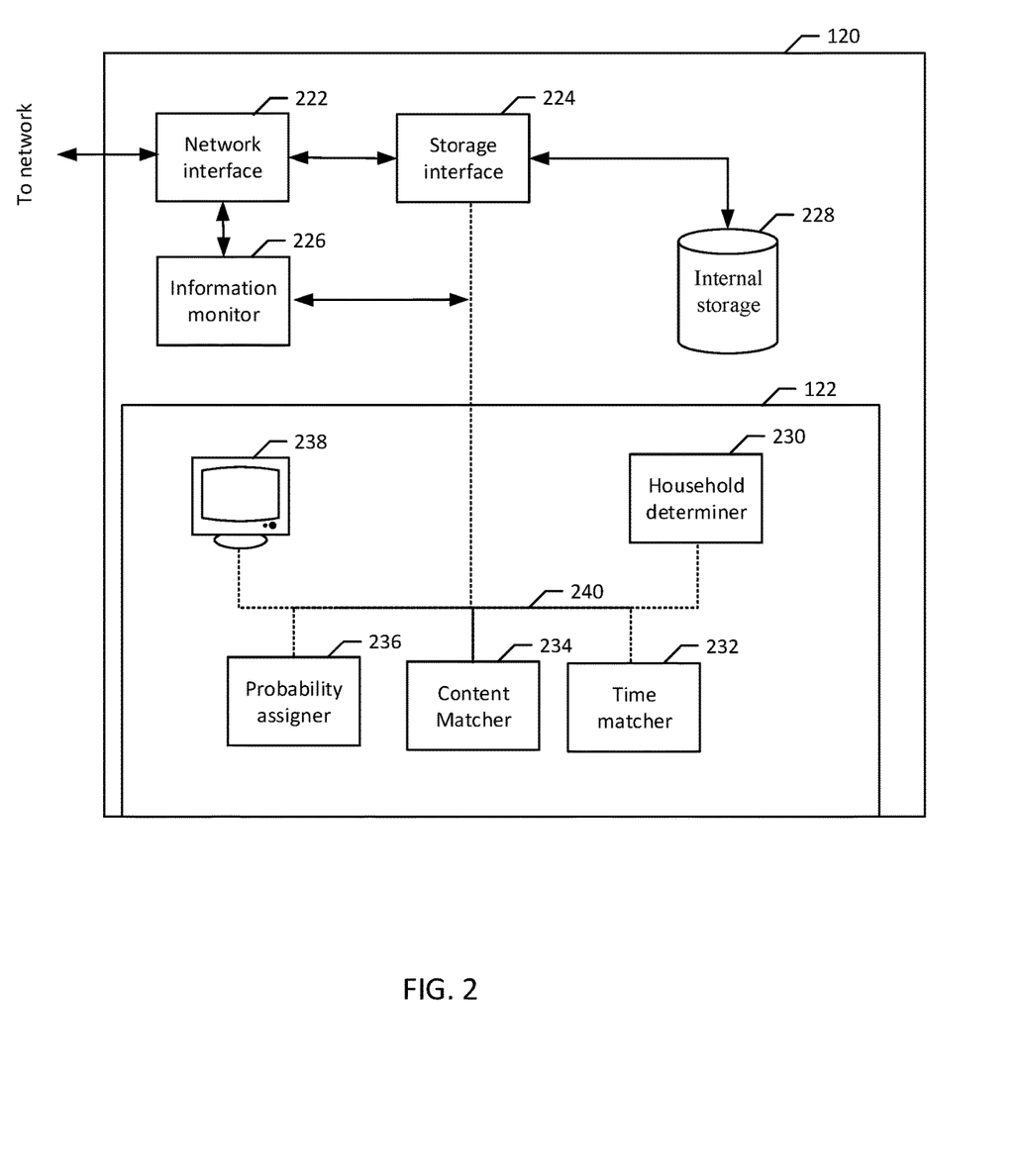
FIG. 2 is an example block diagram of the AME, including the probability of presence determiner, of FIG. 1.

FIG. 2 is an example block diagram of the AME 120 and the probability of presence determiner 122 of FIG. 1. The AME comprises a network interface 222, a storage interface 224, an information monitor 226, internal storage 228 and a probability of presence determiner, for example the probability of presence determiner 122 of FIG. 1. The probability of presence determiner 122 includes a household determiner 230, a time matcher 232, a content matcher 234, a probability assigner 236, a display 238 and bus 240.

In some examples, the probability of presence determiner 122 is not integrated into the AME 120, but is a separate module/device. The separate module/device may be co-located with the AME 120 or may be remote from the AME 120. When the probability of presence determiner 122 is a separate module/device, the probability of presence determiner 122 may have additional modules, for example a network interface, a storage interface, and the like.

In the AME 120, the network interface 222 is communicatively coupled to a network, for example the network 104 of FIG. 1, the storage interface 224 and the information monitor 226. The storage interface 224 is communicatively coupled to the network interface 222, the information monitor 226, internal storage 228 and bus 240. The information monitor 226 is communicatively coupled to the network interface 222, the storage interface 224 and bus 240.

In the probability of presence determiner 122, the household determiner 230, the time matcher 232, the content matcher 234, the probability assigner 236 and the display 238 are communicatively coupled together over bus 240.

In operation, the information monitor 226 receives impressions from the media devices 108 and 110 in the media presentation location 106 of FIG. 1 through network interface 222. The impressions are received in response to the media devices 108 and 110 accessing tagged media from media provider 102 of FIG. 1. The information monitor 226 also receives demographic impression from the database proprietor 118 of FIG. 1 through network interface 222. The demographic impression are created when the media device registered with the database proprietor (e.g. media device 108) accesses tagged media and is redirected to database proprietor 118. Because media device 110 is not registered with the database proprietor 118, the database proprietor 118 does not log impressions from media device 110 when the media device 110 is redirected to the database proprietor 118. Media device 108 is registered with the database proprietor 118, so the database proprietor 118 does log demographic impressions from media device 108 when the media device 108 is redirected to the database proprietor 118.

The demographic impression logged by the database proprietor 118 may be accessed by the information monitor 226 in any manner, for example by polling the database proprietor 118 on a periodic and/or aperiodic fashion, receiving the demographic impression each time the database proprietor 118 records a demographic impression, or the like. The impressions and demographic impressions may be held in memory or stored for later use, for example in internal storage 228.

The information monitor 226 compares impressions it receives from the media devices to demographic impressions from the database proprietors. The information monitor 226 identifies an impression from a device that has one shared data item with one or more demographic impressions from a different device. The information monitor 226 passes the identified demographic impressions and the impression with the shared data item, to the probability of presence determiner 122 or stores them in the internal storage 228 for access by probability of presence determiner 122 at a later time. The probability of presence determiner 122 determines a probability of presence at the device that has one shared data item for the user of the different device.

In the probability of presence determiner 122, the household determiner 230 accesses the identified demographic impressions from one device and the impression with the shared data item from the different device to determine if the two devices are in the same household. The two devices are considered to be in the same household if they were at the same location when the different impressions were recorded. One way to detect if the two devices were in a common location is to compare the public IP addresses used by the devices to access the media. When the public IP addresses are the same, both devices were accessing the network 104 through the same home access point, for example the home access point 112 in FIG. 1. Therefore, when the two devices used the same IP address, the two devices will be considered to be in the same household.

In some examples, the media devices include global positioning system (GPS) coordinates in the impression information. The GPS coordinates from the two devices can be compared. When the GPS coordinates are within a threshold distance, the two devices will be considered to be in the same household. Other methods to determine the location of the devices when the impressions were recorded may also be used.

When the two devices are not found to be in the same household, the probability of presence for the user of the first device 108 to be at the second device 110 is set to zero by the probability assigner 230. When the two devices are found to be in the same household, the demographic impressions from the first device 108 and the impression from the second device 110 will be passed to the time matcher 232, the content matcher 234 and the probability assigner 236 to determine the probability of presence of the user of the first device 108, at the media presentation of the second device 110. In this example, the demographic information identified the user as a 35 year old female that is married to a 35 year old male, the user has 3 children, ages 8, 12 and 15, has a college degree and works for Company A.

The time matcher 232 compares the timestamp between the demographic impressions from the first device 108 to the timestamp of the impression from the second device 110. When the timestamps are for similar periods in a day and/or similar days in a week, the probability that the user of the first device 108 was using the second device 110 during the impression recorded for the second device 110 increases.

The time matcher 232 may also compare the timestamp to the demographic data. The time of day in the timestamp may indicate that one age range is more likely than another age range to be viewing the event.

Table 1 (below) is an example of a subset of the impression information for the demographic impressions from the first device 108 and the impression from the second device 110.

TABLE 1

| Content | Device | Timestamp | IP address | Female, 35 | Child 8 |
|---|---|---|---|---|---|
| Game of Thrones | Browser on laptop 108 | 2014 May 4 21:05:03 | Home IP address | Database proprietor ID detected | |
| Game of Thrones | Browser on laptop 108 | 2014 May 8 19:05:03 | Home IP address | Database proprietor ID detected | |
| Game of Thrones | Browser on laptop 108 | 2014 May 10 18:05:03 | Home IP address | Database proprietor ID detected | |
| Game of Thrones | Smart TV 110 | 2014 May 11 21:05:03 | Home IP address | High probability | Low probability |

The first column lists the content of the media. In this example, the content of the media is the program "Game of Thrones." The second column lists the device that accessed the media. The third column is the timestamp of the impression. The fourth column is the IP address used by the device when the media was accessed. The fifth column is the user of the first device 108 as listed by the database proprietor. The sixth column is an additional member of the household of the user of the first device 108, as listed by the database proprietor. In practice, all the members of the household identified by the database proprietor would be evaluated for the probability of presence, for example, the 34 year old husband and the other two children would also be evaluated, but they are not shown in this example for clarity.

The first, second and third rows are demographic impressions logged by the database proprietor for the first device 108, indicated by having a Database proprietor ID detected for the impression. The fourth row is the impression for the second device 110. The impression for the second device 110 has at least one shared data item with each of the demographic impressions for the first device 108.

In Table 1, the timestamps for the three demographic impressions (rows 1, 2 and 3) from the first device 108 are all between 7:05 pm and 9:05 pm (e.g. in the evening). The timestamp for the impression from the second device 110 is for 9:05 pm, which is also in the evening. Because the impression from the second device 110 occurred during the same period of the day (e.g. the evening) as the demographic impressions from the first device 108, the probability that it was the user of the first device 108 that was using the second device 110 is increased.

The days indicated for the three demographic timestamps are May 4$^{th}$ 8$^{th}$ and 10$^{th}$. The day the impression from the second device 110 was logged was May 11$^{th}$. All the impressions occurred over the period of a single week. Therefore, the probability that it was the user of the first device 108 that was using the second device 110 is increased. The day of the week for the different impressions may also be compared, for example if each impression occurred on a Monday, the probability that the user of the first device 108 was using the second device 110 would increase.

The timestamp from the second impression can be compared to the demographic data. In Table 1, the timestamp for the impression from the second device 110 is for 9:05 pm. It is unlikely that an 8 year old child would be watching media at 9:00 pm. Therefore the probability that the 8 year old child was using the second device 110 is reduced. It may not be any more or less likely that the 35 year old female was watching a media presentation at 9:00 pm. Therefore, the probability of presences for the 35 year old female remains unchanged.

The mapping between demographic information and the likelihood of an event can be accessed from a database of impression information vs. demographic information. The database can be created by the AME and stored for use by the probability of presence determiner, for example in internal storage 228. For example, the likelihood for a person in a given age range for watching a media presentations at a given time in a day, or a given day in a week, can be accessed from the database.

The content matcher 234 compares the content between the demographic impressions from the first device 108 to the content of the impression from the second device 110. When the content is similar, the probability that the user of the first device 108 was using the second device 110 during the impression recorded for the second device 110 increases. In Table 1, the content of the media from the demographic impressions (rows 1, 2, and 3) was the "Game of Thrones." The content of the media from the impression on the second device 110 was also the "Game of Thrones" (e.g. a match). Therefore, the probability that it was the user of the first device 108 that was using the second device 110 to watch the "Game of Thrones" is increased.

The content matcher 234 may also compare the content with the demographic information using the database of impression information vs. demographic information. Some content is more likely to be viewed by one gender vs. the other gender. For example, "Die Hard" may have a higher probability of being watched by a male than a female. Some content may not have a gender preference. In this example it is equally likely that a male or female would watch "The game of Thrones". Therefore the probability that it was the female that was using the second device 110 to watch "The game of Thrones" is unchanged.

Some content may have an age preference. For example, "Teenage Mutant Ninja Turtles" is more likely to be watched by children than by an adult. The content from the second device 110 (row 4) was the "Game of Thrones". The "Game of Thrones" is more likely to be watched by an adult than a child. Therefore the probability that the 35 year old was using the second device 110 is increased and the probability that the 8 year old was using the second device 110 is decreased.

The probability assigner 236 accesses the information from the time matcher 232, the content matcher 234 and the household determiner 230 and assigns a probability of presences for users of the second device 110. The probability for each household member is determined. In some examples, the probability for each household member is set at a baseline, and then the probability is adjusted up or down based on the results from the time matcher 232, the content matcher 234 and the household determiner 230. In some examples, the probability of presence is assigned as a specific probability (e.g., 75%). In other examples, a range of probabilities may be assigned or a broad description may be used (e.g., high probability, medium probability or the like).

In the example from Table 1, the probability that the 35 year old female was using the second device 110 during the impression is high and the probability that the 8 year old child was using the second device 110 during the impression is low. The probability assigner 236 may also assign a household member as an audience member to the impression. The probability of presence may be compared to a threshold, and when the probability of presence is above the threshold, the household member is assigned as an audience member for that impression. In some examples, more than one member of the household may be assigned as an audience member during the impression. In some examples, the probability assigner 236 may save or display the probability of presence for each member of the household, or may only save the members of the household that were assigned as audience members to the impression. The probability assigner 236 can use display 238 to display the results.

While an example manner of implementing the probability of presence determiner 122 of FIG. 1 is illustrated in FIG. 2, one or more of the elements, processes and/or devices illustrated in FIG. 2 may be combined, divided, re-arranged, omitted, eliminated and/or implemented in any other way. Further, the example household determiner 230, the example time matcher 232, the example content matcher 234, the example probability assigner 236 and/or, more generally, the example probability of presence determiner 122 of FIG. 2 may be implemented by hardware, software, firmware and/or any combination of hardware, software and/or firmware. Thus, for example, any of the example household determiner 230, the example time matcher 232, the example content matcher 234, the example probability assigner 236 and/or, more generally, the example probability of presence determiner 122 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, household determiner 230, the example time matcher 232, the example content matcher 234, the example probability assigner 236 is/are hereby expressly defined to include a tangible computer readable storage device or storage disk such as a memory, a digital versatile disk (DVD), a compact disk (CD), a Blu-ray disk, etc. storing the software and/or firmware. Further still, the example probability of presence determiner 122 of FIG. 1 may include one or more elements, processes and/or devices in addition to, or instead of, those illustrated in FIG. 2, and/or may include more than one of any or all of the illustrated elements, processes and devices.

Figure 3:
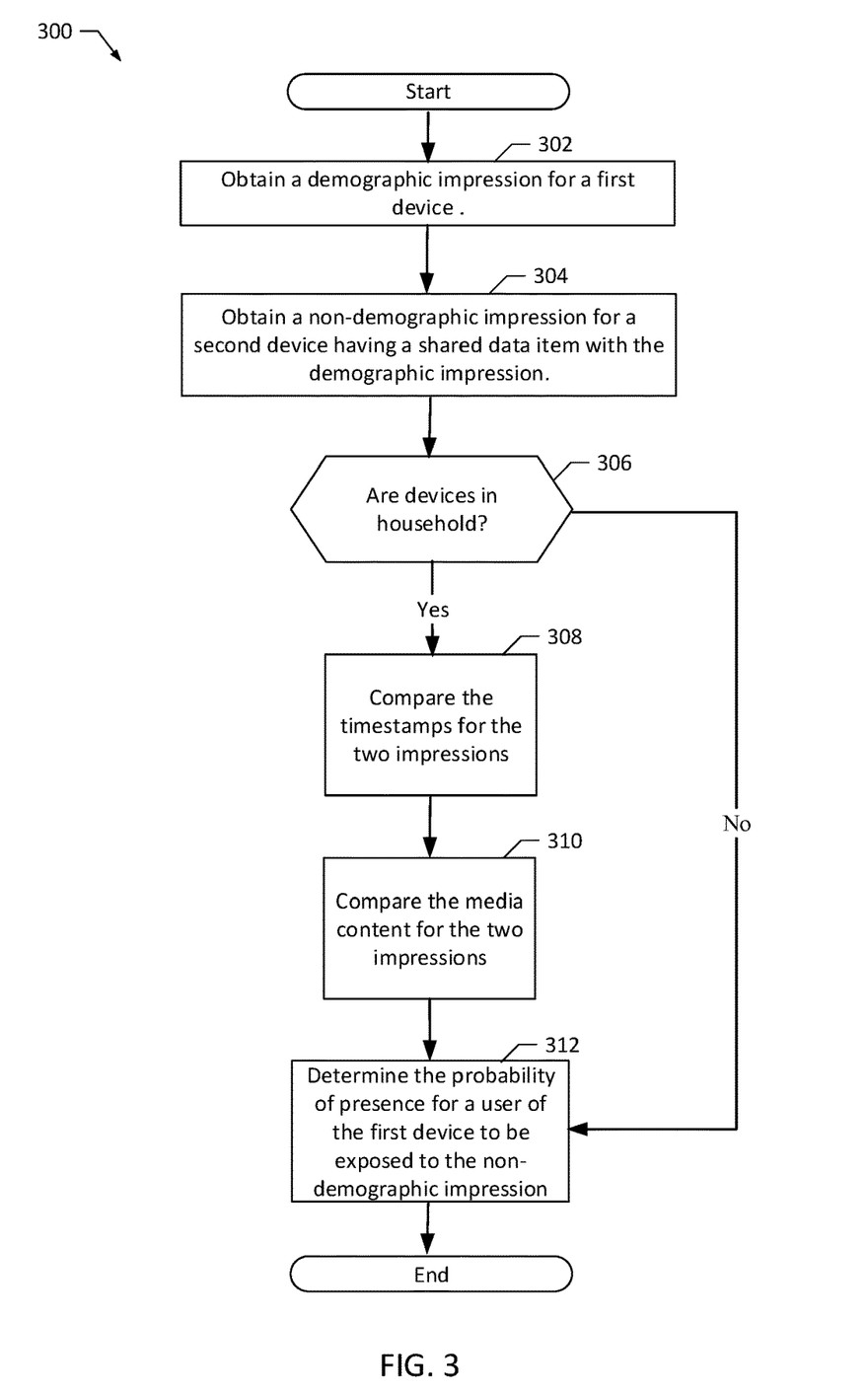
FIG. 3 is a flowchart representative of example machine readable instructions for implementing the probability of presence determiner 122 of FIG. 2.

A flowchart representative of example machine readable instructions for implementing the probability of presence determiner 122 of FIG. 2 is shown in FIG. 3. In this example, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example probability of presence determiner 122 of FIG. 2 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 300 of FIG. 3 begins at block 302 where the household determiner 230 of FIG. 2 obtains a demographic impression for a first device, for example device 108. and a non-demographic impression for a second device, for example device 110, where the non-demographic impression has a shared data item with the demographic impression. A non-demographic impression may also be known as a census impression or just as an impression.

The household determiner 230 obtains a non-demographic impression for a second device, for example device 110, where the non-demographic impression has a shared data item with the demographic impression (block 304). A non-demographic impression may also be known as a census impression or just as an impression.

The household determiner 230 determines if the first and second devices are in the same household (block 306). In one example, the household determiner 230 uses the IP address of the first and second devices to determine if the devices are in the same household. In another example the household determiner 230 uses GPS coordinates to determine if the devices are in the same household.

When the two devices are in the same household, the household determiner 230 passes the data to the time matcher 232 of FIG. 1. When the two devices are not in the same household, the household determiner 230 passes the data to the probability assigner 236 of FIG. 1.

The time matcher 232 of FIG. 1 compares the timestamp between the demographic impressions from the first device 108 to the timestamp of the impression from the second device 110 (block 308). When the timestamps are for similar periods in a day and/or similar days in a week, the probability that the user of the first device 108 was using the second device 110 during the impression recorded for the second device 110 increases.

The time matcher 232 also compares the timestamp to the demographic data. The time of day in the timestamp may indicate that one age range is more likely than another age range to be viewing the event. The time matcher 232 indicates if the probability of presence for members of the household will be increased or decreased depending on the comparisons.

The content matcher 234 compares the content between the demographic impressions from the first device 108 to the content of the impression from the second device 110 (block 310). When the content is similar, the probability that the user of the first device 108 was using the second device 110 during the impression recorded for the second device increases.

The content matcher 234 also compares the content with the demographic information. Some content is more likely to be viewed by one gender vs. the other gender. Some content may have an age preferences. The content matcher 234 compares the content to the gender and age of the household members. The content matcher 234 indicates if the probability of presence for members of the household will be increased or decreased depending on the comparisons.

The probability assigner 236 accesses the information from the time matcher 232, the content matcher 234 and the household determiner 230 and assigns a probability of presences for users of the second device 110 (block 312). When the two devices are not found to be in the same household, the probability of presence for the user of the first device 108 to be exposed to the media from the second device 110 is set to a very low probability, for example zero, by the probability assigner 230.

When the two devices are in the same household, the probability of presence for the user of the first device 108 to be exposed to the non-demographic impression from the second device 110, is adjusted based on the results from the time matcher 232 and the content matcher 234. In some examples, the probability for each household member is set at a baseline probability, and then the baseline probability is adjusted up or down based on the results from the time matcher 232 and the content matcher 234. The baseline probability may be based on the number of people in the household, for example, when there are two people in the household the baseline probability may be set to 50% for each person, when there are three people in the household the baseline probability may be set at 33% for each person in the household.

The baseline probability may adjusted using a multiplier for each positive or negative match determined by the time matcher 232 and the content matcher 234. For example, when the timestamp for a demographic impression match (e.g. occur during the same part of the day) the timestamp for the impression from the second device, for example device 110, the baseline may be multiplied by 1.10% (e.g. the baseline probability is increased by 10%). When the timestamp for a demographic impression does not match (e.g. occur during the same part of the day) the timestamp for the impression from the second device, the baseline may be multiplied by 0.90%.

In some examples the probability is assigned as a specific probability (e.g. 75%). In other examples, a range of probabilities may be assigned (e.g. between 50% and 75%) or a broad description may be used (e.g. high probability, medium probability or the like).

The probability assigner 236 may also assign a household member as an audience member to the impression. The probability of presence may be compared to a threshold, and when the probability of presence is above the threshold, the household member is assigned as an audience member for that impression. In some examples, more than one member of the household may be assigned as an audience member during the impression. In some examples, the probability assigner 236 may save or display the probability of presence for each member of the household, or may only save the members of the household that were assigned as audience members to the impression. The probability assigner 236 can use display 238 to display the results.

Figure 4:
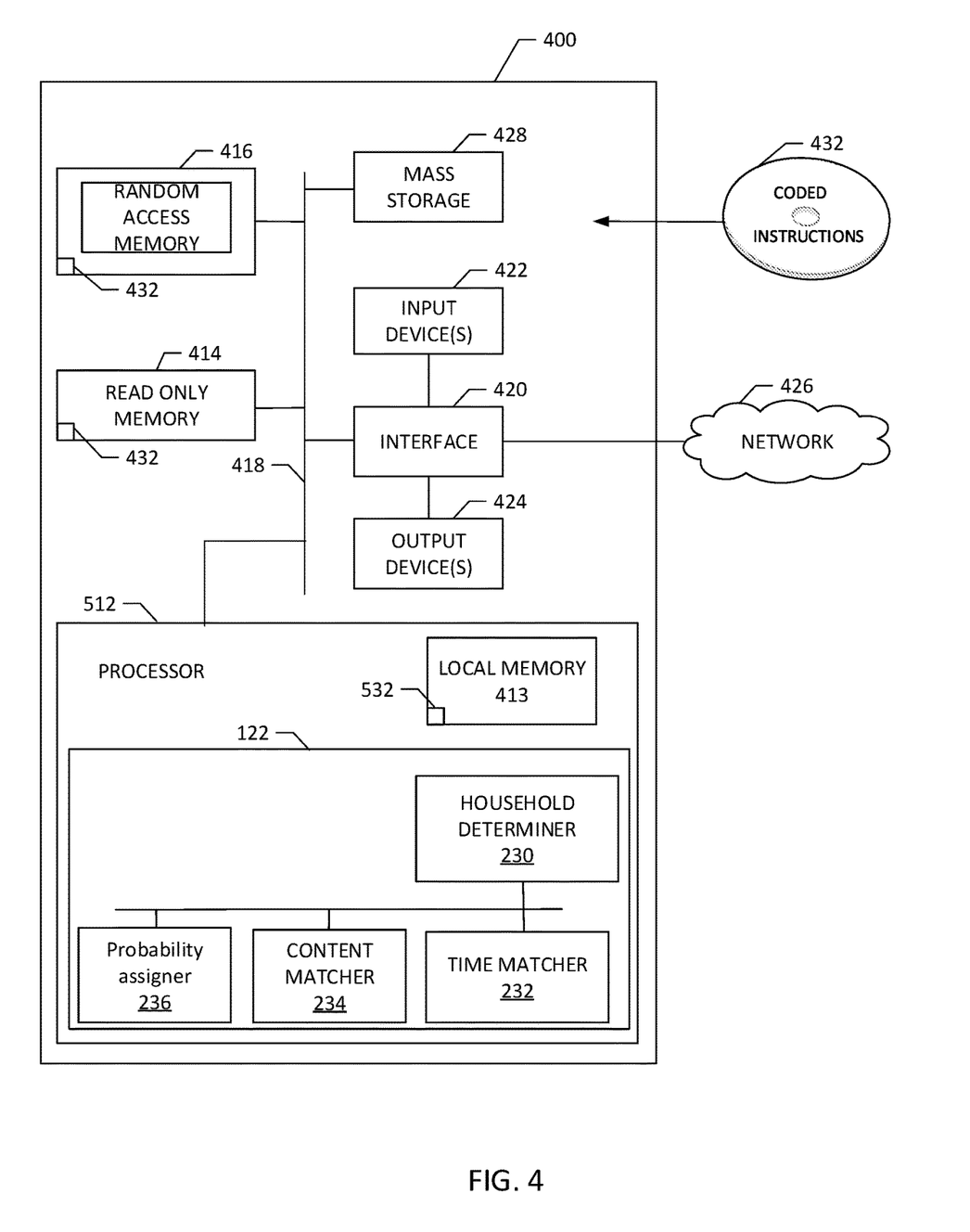
FIG. 4 is a block diagram of an example processor platform 400 capable of executing the instructions of FIG. 3 to implement the probability of presence determiner 122 of FIG. 2

FIG. 4 is a block diagram of an example processor platform 400 capable of executing the instructions of FIG. 3 to implement the probability of presence determiner 122 of FIG. 2. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. In the illustrated example of FIG. 4, the processor 412 is configured via example instructions 432 to implement the example household determiner 230, the example time matcher 232, the example content matcher 234 and the probability determiner 236 of FIG. 2.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the volatile memory 414, in the non-volatile memory 416, and/or on a removable tangible computer readable storage medium such as a CD or DVD.

From the foregoing, it will appreciate that the above disclosed methods, apparatus and articles of manufacture for a probability of presence determiner can assign demographic information to an unknown user of a second device by using demographic information from a first device, where the demographic information from the first device is obtained by a database proprietor that the first device is registered with.

The methods, apparatus and articles of manufacture for a probability of presence determiner can also use the demographic information from the first device to generate a list of household members for the household that includes the user of the first device. The probability of presence for each member of the household can be determined for use of the second device. This allows a census impression for the second device to be converted into a demographic impression.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
a memory storing instructions thereon; and
a processor to execute the instructions to:
determine a first probability of presence based on a first demographic impression, a non-demographic impression, and a shared data item, the first demographic impression logged by a database proprietor for a first device, the non-demographic impression logged for a second device, the shared data item provided by the first device, the first probability of presence indicative of a likelihood that a user of the first device corresponds to the non-demographic impression;
increase the first probability of presence from a baseline probability of presence based on a first day of the first demographic impression matching a second day of the non-demographic impression, the baseline probability of presence based on a quantity of members of a household;
present, via a display, the first probability of presence as corresponding to the non-demographic impression based on comparisons of the first probability of presence and second probabilities of presence to a threshold, the comparisons being after the first probability of presence is increased based on the first day matching the second day, the second probabilities of presence corresponding to the members of the household, the first and second devices pertaining to the household;
convert the non-demographic impression to a second demographic impression based on the first and second probabilities of presence; and
log the second demographic impression.

2. The system of claim 1, wherein the first demographic impression is logged in association with second demographic information of a subscriber of the database proprietor.

3. The system of claim 1, wherein the processor is to execute the instructions to determine one of the second probabilities of presence for a second member of the household, the second member of the household different than a first member of the household, the first member associated with the first probability of presence, the one of the second probabilities of presence indicative of a second likelihood that the second member of the household corresponds to the non-demographic impression logged for the second device, the one of the second probabilities of presence based on the first demographic impression, the non-demographic impression, and the shared data item.

4. The system of claim 1, wherein a plurality of demographic impressions logged in association with the shared data item is used to determine the first probability of presence for the user of the first device.

5. The system of claim 4, wherein a first impression record of the plurality of demographic impressions is from the database proprietor and a second impression record of the plurality of demographic impressions is from a second database proprietor, different from the database proprietor.

6. The system of claim 4, wherein the database proprietor corresponds to at least one of a social network website, a multi-service website, an online retailer website, a credit reporting website, or a streaming media website.

7. A tangible computer readable medium comprising computer readable instructions to cause a processor to at least:
determine a first probability of presence based on a first demographic impression, the non-demographic impression, and a shared data item, the first demographic impression logged by a database proprietor for a first device, the non-demographic impression logged for a second device, the shared data item provided by the first device, the first probability of presence indicative of a likelihood that a user of the first device corresponds to the non-demographic impression;
increase the first probability of presence from a baseline probability of presence based on a first day of the first demographic impression matching a second day of the non-demographic impression, the baseline probability of presence based on a quantity of members of a household;
present, via a display, the first probability of presence as corresponding to the non-demographic impression based on comparisons of the first probability of presence and second probabilities of presence to a threshold, the comparisons being after the first probability of presence is increased based on the first day matching the second day, the second probabilities of presence corresponding to the members of the household, the first and second devices pertaining to the household; and
convert the non-demographic impression to a second demographic impression based on the first and second probabilities of presence; and
log a record of the second demographic impression in association with demographic information based on the first and second probabilities of presence.

8. The tangible computer readable medium as defined in claim 7, wherein the first demographic impression is logged in association with second demographic information of a subscriber of the database proprietor.

9. The tangible computer readable medium as defined in claim 7, wherein the computer readable instructions are to cause the processor to determine one of the second probabilities of presence for a second member of the household, the second member of the household different than a first member of the household, the first member associated with the first probability of presence, the one of the second probabilities of presence indicative of a second likelihood that the second member of the household corresponds to the non-demographic impression logged for the second device, the one of the second probabilities of presence based on the first demographic impression, the non-demographic impression, and the shared data item.

10. The tangible computer readable medium as defined in claim 7, wherein a plurality of demographic impressions logged in association with the shared data item is used to determine the first probability of presence for the user of the first device.

11. The tangible computer readable medium as defined in claim 10, wherein a first impression record of the plurality of demographic impressions is from the database proprietor and a second impression record of the plurality of demographic impressions is from a second database proprietor, different from the database proprietor.

12. The tangible computer readable medium as defined in claim 10, wherein the database proprietor corresponds to at least one of a social network website, a multi-service website, an online retailer website, a credit reporting website, or a streaming media website.

13. A method comprising:
  determining, by executing an instruction with a processor, a first probability of presence based on a first demographic impression, a non-demographic impression, and a shared data item, the first demographic impression logged by a database proprietor for a first device, the non-demographic impression logged for a second device, the shared data item provided by the first device, the first probability of presence indicative of a likelihood that a user of the first device corresponds to the non-demographic impression;
  increasing, by executing an instruction with the processor, the first probability of presence from a baseline probability of presence based on a first day of the first demographic impression matching a second day of the non-demographic impression, the baseline probability of presence based on a quantity of members of a household;
  presenting, via a display, the first probability of presence as corresponding to the non-demographic impression based on comparisons of the first probability of presence and second probabilities of presence to a threshold, the comparisons being after the first probability of presence is increased based on the first day matching the second day, the second probabilities of presence corresponding to the members of the household, the first and second devices pertaining to the household;
  converting, by executing an instruction with the processor, the non-demographic impression to a second demographic impression based on the first and second probabilities of presence; and
  logging, by executing an instruction with the processor, the second demographic impression.

14. The method of claim 13, wherein the first demographic impression is logged in association with second demographic information of a subscriber of the database proprietor.

15. The method of claim 13, further including determining one of the second probabilities of presence for a second member of the household, the second member of the household different than a first member of the household, the first member associated with the first probability of presence, the one of the second probabilities of presence indicative of a second likelihood that the second member of the household corresponds to the non-demographic impression logged for the second device, the one of the second probabilities of presence based on the first demographic impression, the non-demographic impression, and the shared data item.

16. The method of claim 13, wherein a plurality of demographic impressions logged in association with the shared data item is used to determine the first probability of presence for the user of the first device.

17. The method of claim 16, wherein a first impression record of the plurality of demographic impressions is from the database proprietor and a second impression record of the plurality of demographic impressions is from a second database proprietor, different from the database proprietor.

18. The method of claim 16, wherein the database proprietor corresponds to at least one of a social network website, a multi-service website, an online retailer website, a credit reporting website, or a streaming media website.

* * * * *